(12) United States Patent  (10) Patent No.: US 8,789,404 B2
Taylor et al.  (45) Date of Patent: Jul. 29, 2014

(54) COMPRESSION LIMITER HAVING RETENTION FEATURES

(75) Inventors: Alan Taylor, Lake Orion, MI (US); Donald D. Cooper, Fond du Lac, WI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 81 days.

(21) Appl. No.: 13/384,707

(22) PCT Filed: Jul. 22, 2010

(86) PCT No.: PCT/US2010/042843
§ 371 (c)(1),
(2), (4) Date: Jan. 18, 2012

(87) PCT Pub. No.: WO2011/011569
PCT Pub. Date: Jan. 27, 2011

(65) Prior Publication Data
US 2012/0121362 A1  May 17, 2012

Related U.S. Application Data

(60) Provisional application No. 61/227,992, filed on Jul. 23, 2009.

(51) Int. Cl.
*B21J 13/00* (2006.01)
(52) U.S. Cl.
USPC .............. 72/354.6; 72/344; 72/353.2; 72/359
(58) Field of Classification Search
USPC .................. 72/344, 352, 353.2, 353.6, 354.2, 72/354.6, 354.8, 358, 359; 419/38, 66
See application file for complete search history.

(56) References Cited

U.S. PATENT DOCUMENTS

| 3,688,717 | A | * | 9/1972 | Rudolph et al. ................ 72/356 |
| 3,694,127 | A | * | 9/1972 | Takahashi et al. ............. 425/352 |
| 3,807,913 | A | * | 4/1974 | Brede et al. ..................... 425/78 |
| 3,842,646 | A | * | 10/1974 | Kuhn ........................... 72/354.8 |
| 4,143,696 | A | | 3/1979 | Holton et al. |
| 4,153,399 | A | | 5/1979 | DeSantis |
| 4,289,061 | A | | 9/1981 | Emmett |

(Continued)

FOREIGN PATENT DOCUMENTS

CN 1518643 A 8/2004
JP H06173988 A 6/1994

OTHER PUBLICATIONS

International Search Report and Written Opinion under date of mailing of Sep. 16, 2010 in connection with PCT/US2010/042843.

(Continued)

*Primary Examiner* — Edward Tolan
(74) *Attorney, Agent, or Firm* — Quarles & Brady LLP (57) ABSTRACT

A compression limiter is disclosed that comprises an upper surface and a lower surface. The compression limiter further comprises an inner surface that defines a passageway configured to accommodate a fastener and an outer surface configured to engage a structure in which the compression limiter is placed. A first retainer projects outwardly from the outer surface and includes a first retention surface that has at least a planar portion. The first retainer further includes an undercut surface disposed inwardly from the first retention surface so as to create a corner extending in a direction with at least a component perpendicular to the longitudinal direction. A method of forming the compression limiter is also disclosed.

12 Claims, 14 Drawing Sheets

(56) References Cited

U.S. PATENT DOCUMENTS

| | | | |
|---|---|---|---|
| 4,470,286 A * | 9/1984 | Asari et al. | 72/356 |
| 4,579,258 A | 4/1986 | Brown et al. | |
| 6,174,118 B1 | 1/2001 | Rebers et al. | |
| 6,457,925 B1 | 10/2002 | Genick, II | |
| 6,609,717 B2 | 8/2003 | Hinson | |
| 7,013,696 B2 * | 3/2006 | Ando et al. | 72/355.6 |
| 7,396,198 B2 | 7/2008 | Schultz | |
| 8,413,479 B2 * | 4/2013 | Knott | 72/352 |
| 2003/0086772 A1 | 5/2003 | Giannakakos | |
| 2006/0008376 A1 | 1/2006 | Olsson | |
| 2007/0158918 A1 | 7/2007 | Belter | |
| 2007/0248433 A1 | 10/2007 | Schultz | |
| 2008/0157483 A1 | 7/2008 | Booher et al. | |
| 2010/0083782 A1 * | 4/2010 | Cheisa et al. | 74/458 |

OTHER PUBLICATIONS

Japan Patent Office, Notification of Rejection Reasons, Patent Application No. 2012-521771, Feb. 25, 2014, 5 pages.

\* cited by examiner

COMPRESSION LIMITER HAVING RETENTION FEATURES

CROSS-REFERENCE TO RELATED APPLICATIONS

This application represents the national stage entry of PCT International Application No. PCT/US2010/042843 filed Jul. 23, 2010 which claims the benefit of the filing date of U.S. Provisional Patent Application No. 61/227,992 filed Jul. 23, 2009, both of which are hereby incorporated herein by reference for all purposes.

STATEMENT CONCERNING FEDERALLY SPONSORED RESEARCH OR DEVELOPMENT

Not Applicable.

FIELD OF THE INVENTION

This invention relates to compression limiters, and particularly compression limiters for automotive assemblies.

BACKGROUND OF THE INVENTION

Fasteners are often used to connect a plastic component to another component in various types of assemblies, especially automotive assemblies. However, the fastener must usually be loaded to an extent that would cause the plastic component to quickly deform, fracture or creep over time, thereby reducing the load carried by the fastener. As such, a metal compression limiter (sometimes simply referred to as a bushing or insert) is commonly used in assemblies in which a compressive load is applied to a plastic component. The compression limiter strengthens the plastic component and resists the load applied by the fastener. Therefore, the integrity of the plastic is not compromised and the compression limiter reduces creep of the plastic component.

Typically, a compression limiter has a tubular shape with an outer surface that engages the plastic component. The inner surface of the compression limiter defines a passageway that accommodates the fastener. Most simple compression limiters do not include additional features; as such, the compression limiter may fall out of the plastic component during manufacturing if the compression limiter is inserted by overmolding or press-fitting. To address this problem, some compression limiters include retaining features to provide a more secure connection to the plastic component. For example, some compression limiters include a flanged end that engages a surface of the plastic component outside the hole. Other designs include perforations into which the plastic component flows during an overmolding process.

However, the retention features of the aforementioned designs typically require additional processing steps that significantly increase the overall manufacturing time, and therefore cost, of the compression limiter. For example, some compression limiters are perforated by a punch and then moved to another tooling assembly to be rolled into a cylindrical shape. Considering the limitations of previous designs, a need exists for an improved compression limiter that is easily manufactured.

SUMMARY OF THE INVENTION

In one aspect, the present invention provides a compression limiter that comprises an upper surface and a lower surface. A distance between the lower surface and the upper surface defines a longitudinal direction. The compression limiter further comprises an inner surface that defines a passageway configured to accommodate a fastener and an outer surface configured to engage a structure in which the compression limiter is placed. A distance between the outer surface and the inner surface defines a radial direction perpendicular to the longitudinal direction. The compression limiter further comprises a first retainer that projects outwardly from the outer surface. The first retainer includes a first retention surface that has at least a planar portion perpendicular to the radial direction. The first retainer further includes an undercut surface disposed radially inwardly from the first retention surface so as to create a corner extending in a direction with at least a component perpendicular to the longitudinal direction.

In another aspect, the present invention provides a method for forming the compression limiter from powder metal. The method includes the step of pressing the powder metal in a longitudinal direction with a movable punch and thereby shaping an outer surface of the compression limiter against an inner die surface of a die cavity. An inner surface of the compression limiter is shaped against a core rod disposed in the die cavity while simultaneously shaping the outer surface. A distance between the outer surface and the inner surface of the compression limiter defines a radial direction perpendicular to the longitudinal direction. A retainer projecting from the outer surface of the compression limiter is shaped against a side punch disposed in the die cavity while simultaneously shaping the outer surface. The retainer includes a first retention surface that has at least a planar portion perpendicular to the radial direction. The retainer further includes an undercut surface disposed radially inwardly from the first retention surface. The method further includes the step of removing the compression limiter from the die cavity by lowering the die cavity relative to the side punch. In some embodiments, a plurality of compression limiters are formed simultaneously in a single die cavity.

The foregoing and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

The particulars shown herein are by way of example and only for purposes of illustrative discussion of the embodiments of the invention. The particulars shown herein are presented to provide what is believed to be the most useful and readily understood description of the principles and conceptual aspects of the invention. In this regard, no attempt is made to show structural details of the invention in more detail than is necessary for the fundamental understanding of the invention. The description taken with the drawings should make apparent to those skilled in the art how the several forms of the present invention may be embodied in practice.

Referring now to FIGS. 1-6, a compression limiter 10 of the present invention includes a body 12 that defines a passageway 14 to accommodate a fastener (not shown). The passageway 14 extends from an upper surface 16 to a lower surface 18 in a longitudinal direction 20 defined by a distance between the upper and lower surfaces 16, 18. An inner surface 22 and an outer surface 24 opposite the inner surface 22 provide the compression limiter 10 with a generally open-cylindrical shape. One or more retainers 26 project outwardly from the outer surface 24 to secure the compression limiter 10 to the fastened component (i.e., a component in which the compression limiter 10 is press fitted, over-molded, or the like to prevent deformation due to the load applied by the fastener). These structures are described in further detail in the following paragraphs, beginning with the upper surface 16 and concluding with the retainers 26.

Still referring to FIGS. 1-6, the upper and lower surfaces 16, 18 are preferably planar surfaces that are identical to one another. Such identical surfaces, as well as other structures described in further detail below, provide the compression limiter 10 with a symmetric shape over a plane perpendicular to the longitudinal direction 20 and bisecting the compression limiter 10. That is, the compression limiter 10 may be symmetric over a horizontal plane. The upper and lower surfaces 16, 18 may further include inner shoulder surfaces 28 and outer shoulder surfaces 30 (both of which are mostly easily seen in FIG. 6) proximate the inner and outer surfaces 22 and 24, respectively. The inner shoulder surfaces 28 help position the fastener within the passageway 14. The outer shoulder surfaces 30 provide additional features to assist in securing the compression limiter 10 within the fastened component.

Figure 1:
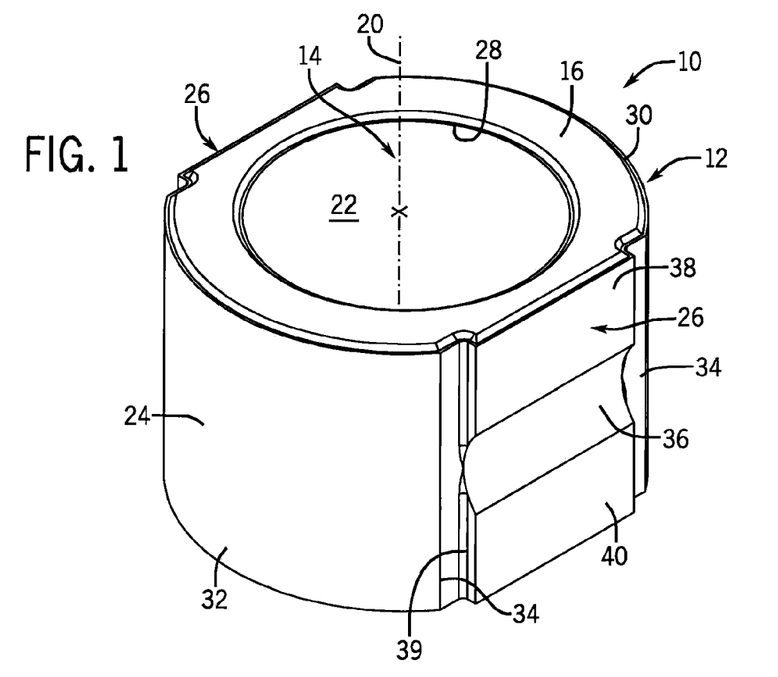
FIG. 1 is a perspective view of a compression limiter of the present invention.
Figure 2:
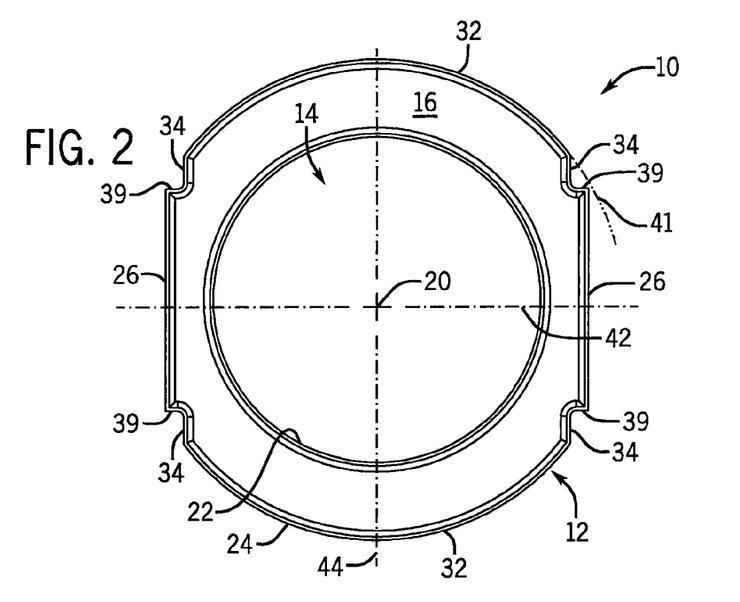
FIG. 2 is a top view of the compression limiter of FIG. 1.
Figure 3:
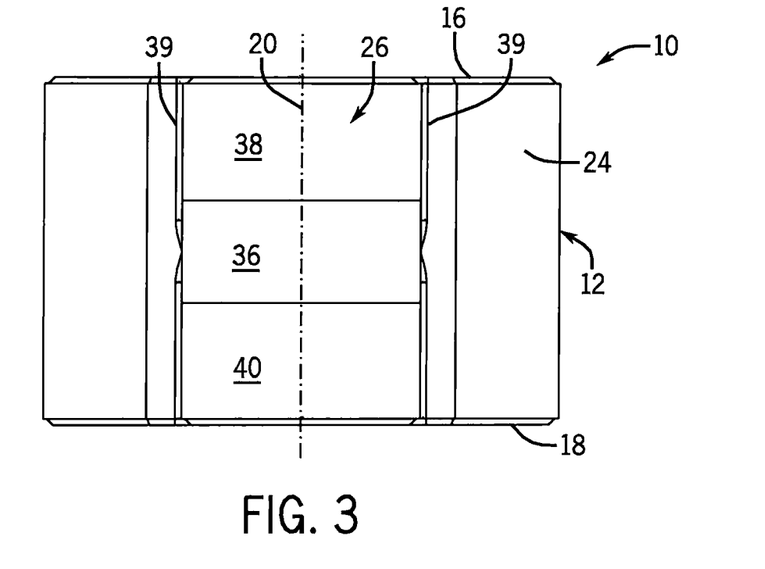
FIG. 3 is a side view of the compression limiter of FIG. 1 showing a retainer.
Figure 4:
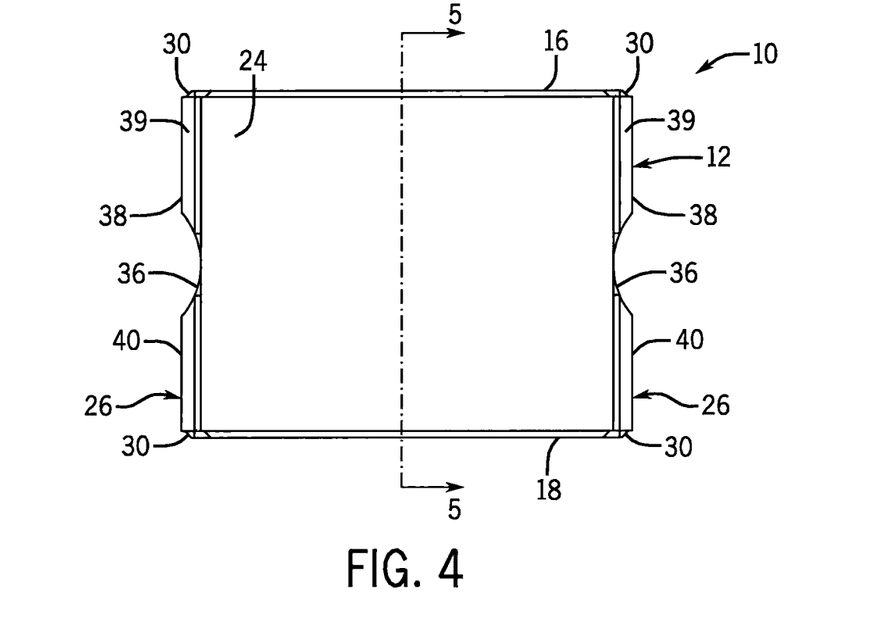
FIG. 4 is a front view of the compression limiter of FIG. 1.
Figure 5:
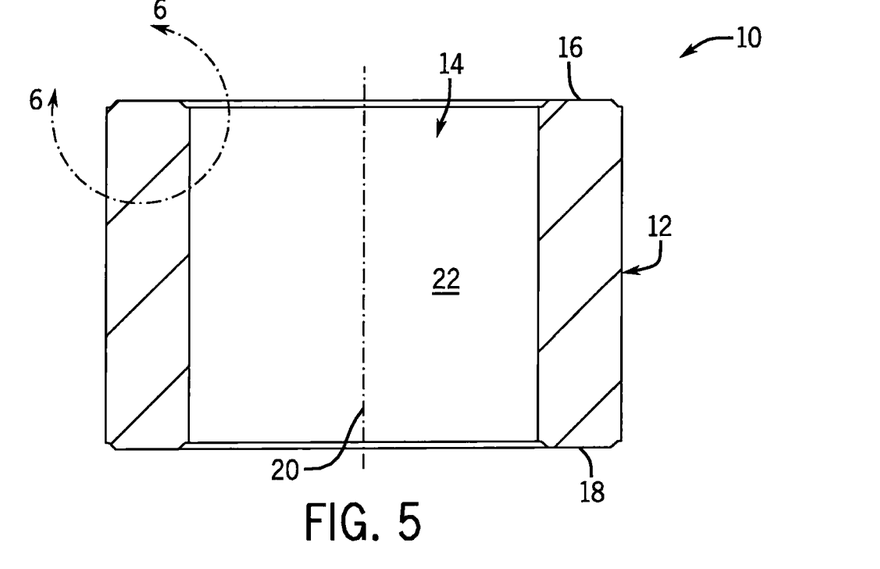
FIG. 5 is a sectional view along line 5-5 of FIG. 4.
Figure 6:
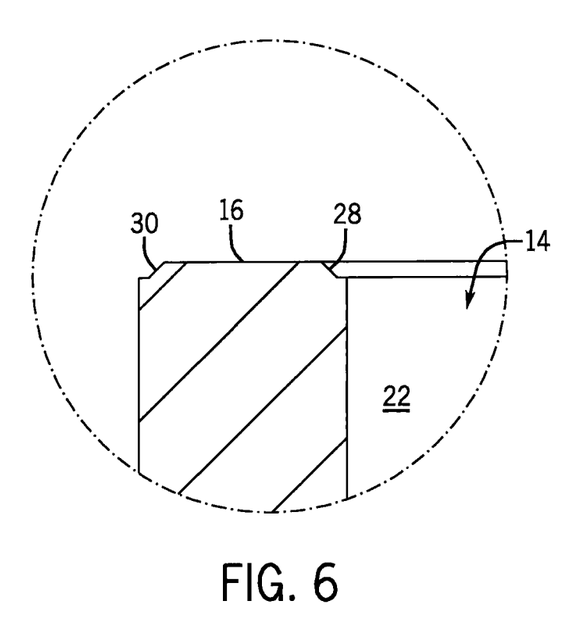
FIG. 6 is a detail view of the area enclosed by line 6-6 of FIG. 5.
Figure 7:
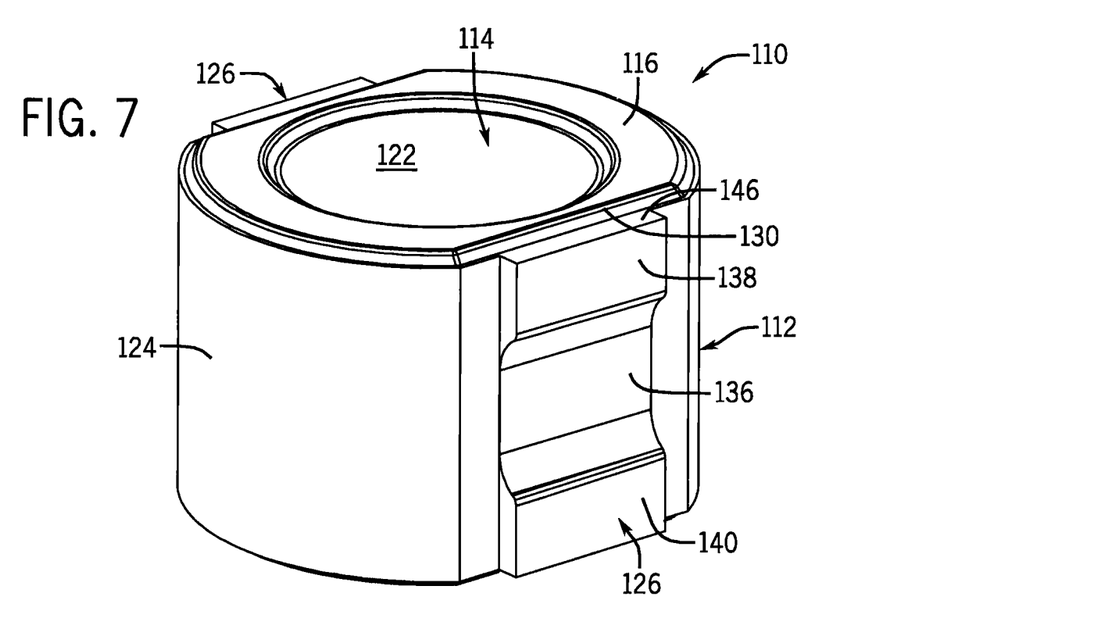
FIG. 7 is a perspective view of a second embodiment of the compression limiter of the present invention.
Figure 8:
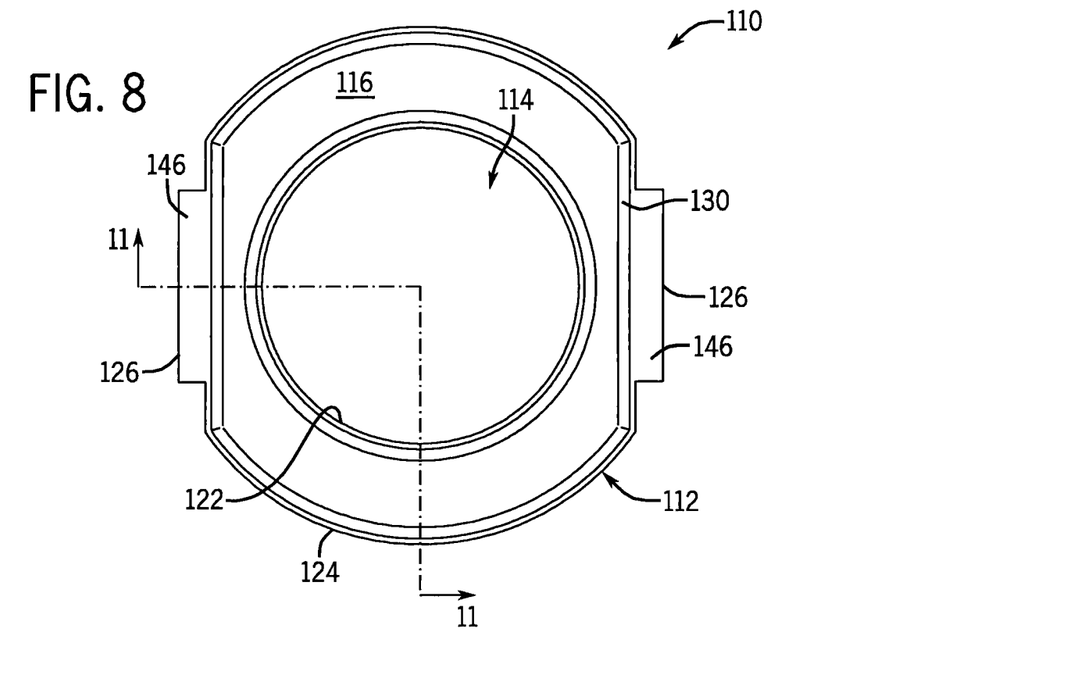
FIG. 8 is a top view of the compression limiter of FIG. 7.
Figure 9:
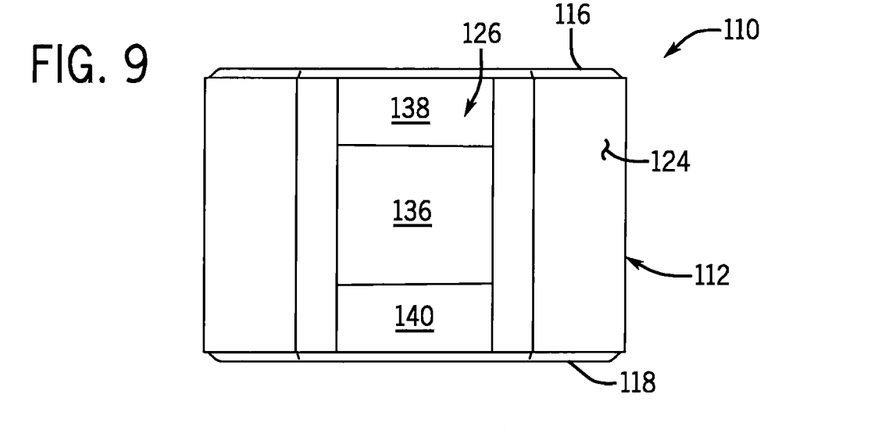
FIG. 9 is a side view of the compression limiter of FIG. 7 showing a retainer.

The inner and outer surfaces 22, 24 are preferably arcuate surfaces or include arcuate portions to provide the overall generally open-cylindrical shape of the compression limiter 10. However, it is also contemplated that the shapes of the inner and outer surfaces 22, 24 may vary to provide a different compression limiter shape. As yet another alternative, the inner and outer surfaces 22, 24 may have an additional opening (not shown) extending from the upper surface 16 to the lower surface 18 to provide a horseshoe-shaped compression limiter 10. In a preferred embodiment, a distance between the inner and outer surfaces 22, 24, or simply the thickness of the body 12, defines a radial direction perpendicular to the longitudinal direction 20. Referring specifically to FIGS. 1 and 2, the outer surface 24 includes arcuate surfaces 32 adjacent planar surfaces 34 from which the retainers 26 project. The width of the arcuate and planar surfaces 32, 34 may be varied to change the distance between the retainers 26 as viewed in FIGS. 2 and 4.

Referring again to FIGS. 1-4, the compression limiter 10 preferably includes two retainers 26 that are diametrically opposed to one another. As such, the compression limiter 10 may have a symmetric shape over planes in the longitudinal direction 20 that bisect the compression limiter 10 (e.g., the vertical planes 42 and 44 of FIG. 2). Each retainer 26 includes an undercut surface 36 disposed between an upper retention surface 38 and a lower retention surface 40. The upper and lower retention surfaces 38, 40 are preferably planar surfaces that are perpendicular to the radial direction. As such, the upper and lower retention surfaces 38, 40 help secure the compression limiter 10 within the fastened component and prevent the compression limiter 10 from rotating relative to the fastened component. The undercut surface 36 is disposed radially inwardly relative to the retention surfaces 38, 40 and may have a arcuate shape. Alternatively, the undercut surface 36 may have a different shape that forms corners between the undercut surface 36 and the retention surfaces 38, 40 that are greater than 90 degrees (e.g., a curved shape, a diagonal surface, or the like). Such a corner is easier to manufacture than a sharp corner and reduces wear on the manufacturing tools described below.

In any case, a portion of the fastened component extends between the retention surfaces 38, 40 and engages the undercut surface 36. This helps secure the compression limiter 10 within the fastened component and prevents the compression limiter 10 from moving longitudinally relative to the fastened component. Each of the surfaces 36, 38 and 40 of the retainer 26 may have a uniform shape as viewed along the surfaces 36, 38 and 40 and in a direction perpendicular to the longitudinal direction 20. Alternatively, the undercut surface 36 may extend in a direction with only a component perpendicular to the longitudinal direction 20 (e.g., the undercut surface 36 may extend diagonally).

Each retainer 26 also includes retention edges 39 between which the retention surfaces 38, 40 are disposed. The retention edges 39 are preferably perpendicular to the retention surfaces 38, 40 and extend in the longitudinal direction 20. However, in some embodiments the retention edges 39 may extend in a direction with only a component parallel to the longitudinal direction 20 (e.g., the retention edges 39 may extend diagonally). Furthermore, the corner between each retention edge 39 and adjacent retention surfaces 40 is preferably disposed radially inwardly relative to a projection 41 of the arcuate surfaces 32 having the same radius and center as the arcuate surfaces 32. Such a feature permits the compression limiter 10 to be presented by typical automated feeding systems. In any case, the retention edges 39 help prevent the compression limiter 10 from rotating relative to the fastened component.

Figure 10:
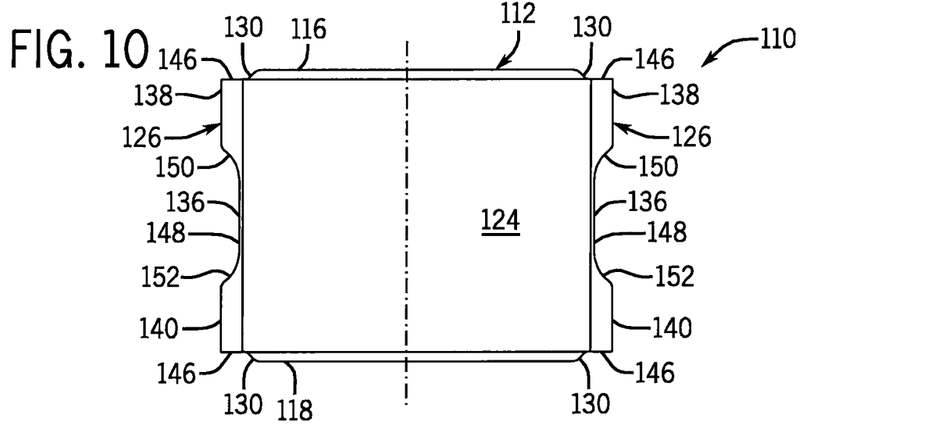
FIG. 10 is a front view of the compression limiter of FIG. 7.
Figure 11:
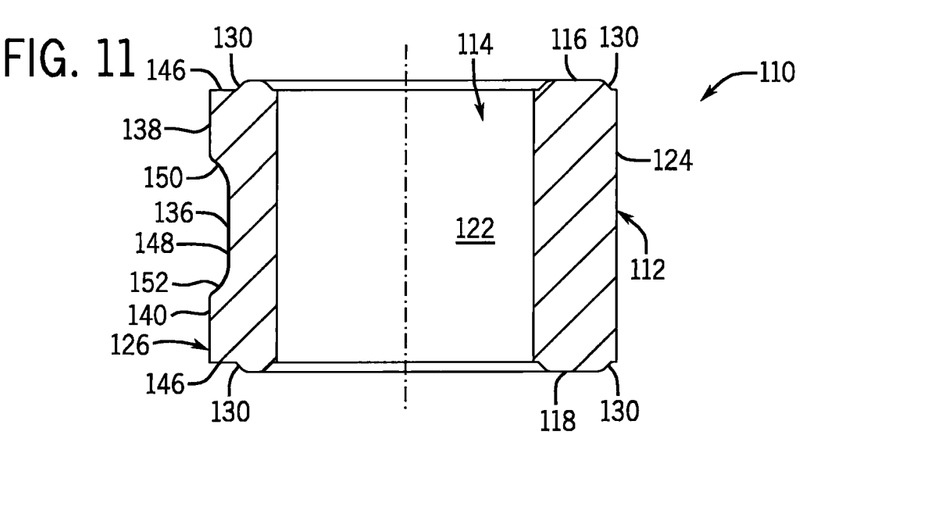
FIG. 11 is a sectional view along line 11-11 of FIG. 8.
Figure 12:
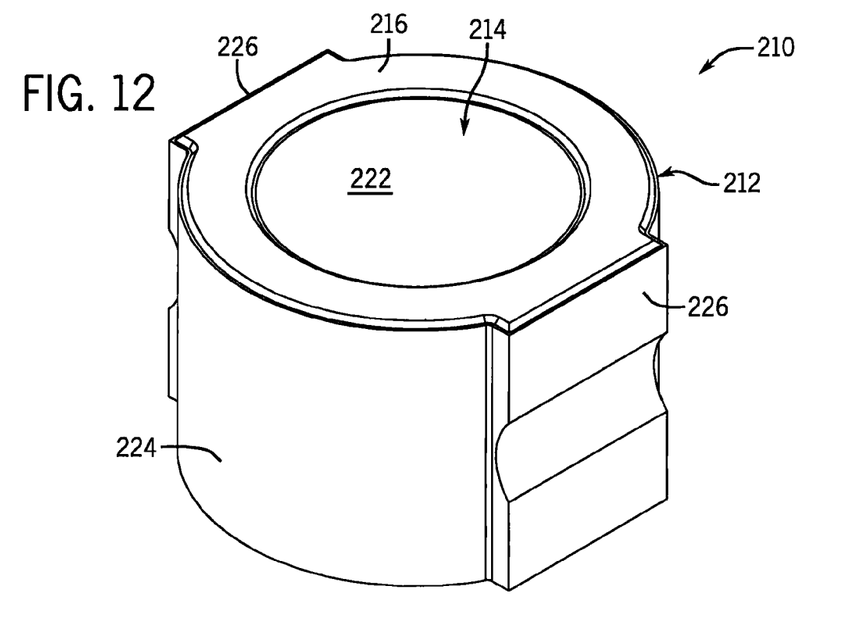
FIG. 12 is a perspective view of a third embodiment of the compression limiter of the present invention.
Figure 13:
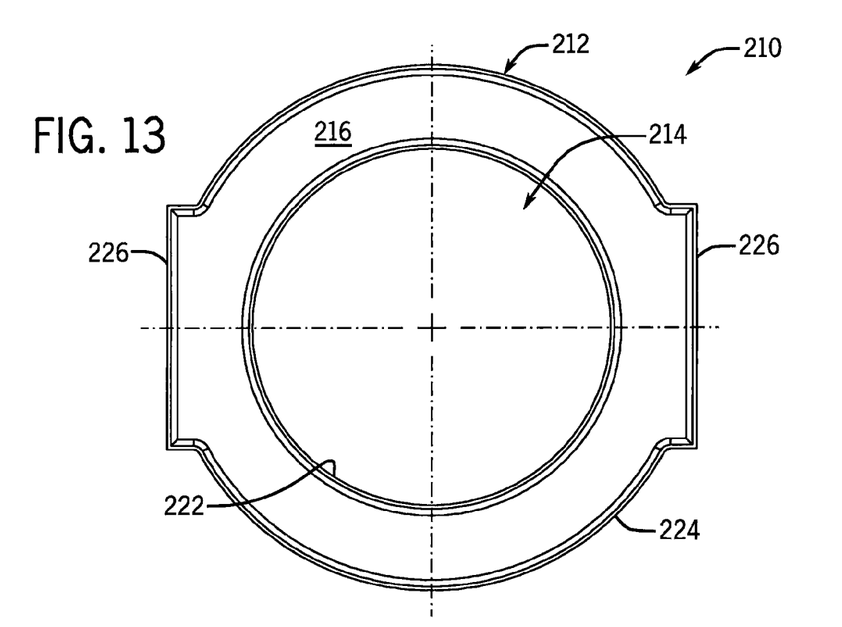
FIG. 13 is a top view of the compression limiter of FIG. 12.
Figure 14:
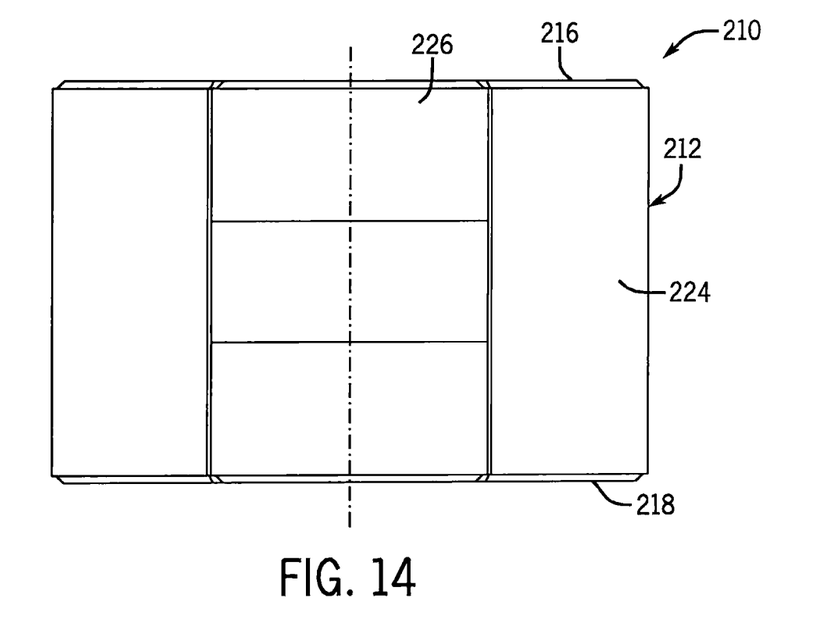
FIG. 14 is a side view of the compression limiter of FIG. 12 showing a retainer.
Figure 15:
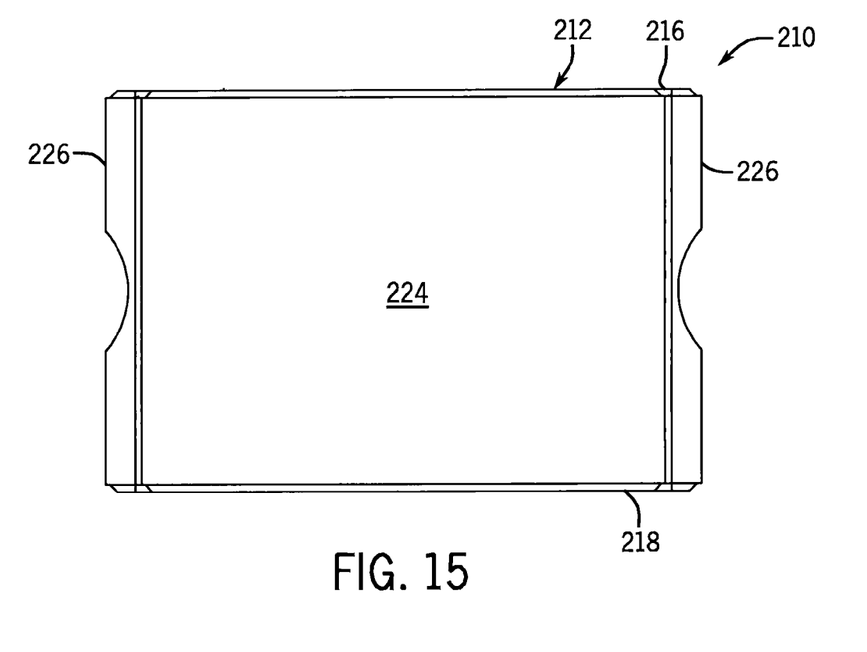
FIG. 15 is a front view of the compression limiter of FIG. 12.

The aforementioned surfaces may vary from the shapes described above without departing from the scope of the invention. For example, in a second embodiment shown in FIGS. 7-11, the compression limiter 110 includes a body 112 that defines a passageway 114 as described above. The body 112 also includes an upper surface 116, a lower surface 118, an inner surface 122, and an outer surface 124 from which one or more retainers 126 project. As shown most clearly in FIGS. 10 and 11, outer shoulder surfaces 130 are spaced apart from axial surfaces 146 of the retainers 126. In addition, each retainer 126 includes an undercut surface 136 disposed between an upper retention surface 138 and a lower retention surface 140. Referring specifically again to FIGS. 10 and 11, each undercut surface 136 includes a planar surface 148 disposed between an upper arcuate surface 150 and a lower arcuate surface 152.

In a third embodiment shown in FIGS. 12-15, the compression limiter 210 includes a body 212 that defines a passageway 214 as described above. The body 212 also includes an upper surface 216, a lower surface 218, an inner surface 222, and an arcuate outer surface 224 from which one or more retainers 226 project. That is, unlike the previously-described embodiments, the outer surface 224 does not include planar surfaces from which the retainers 226 project.

Each of the embodiments described above may include additional undercut surfaces. For example, the compression limiters 10, 110, and 210 may include undercut surfaces extending along lower surfaces 18, 118, and 218, respectively.

Figure 16:
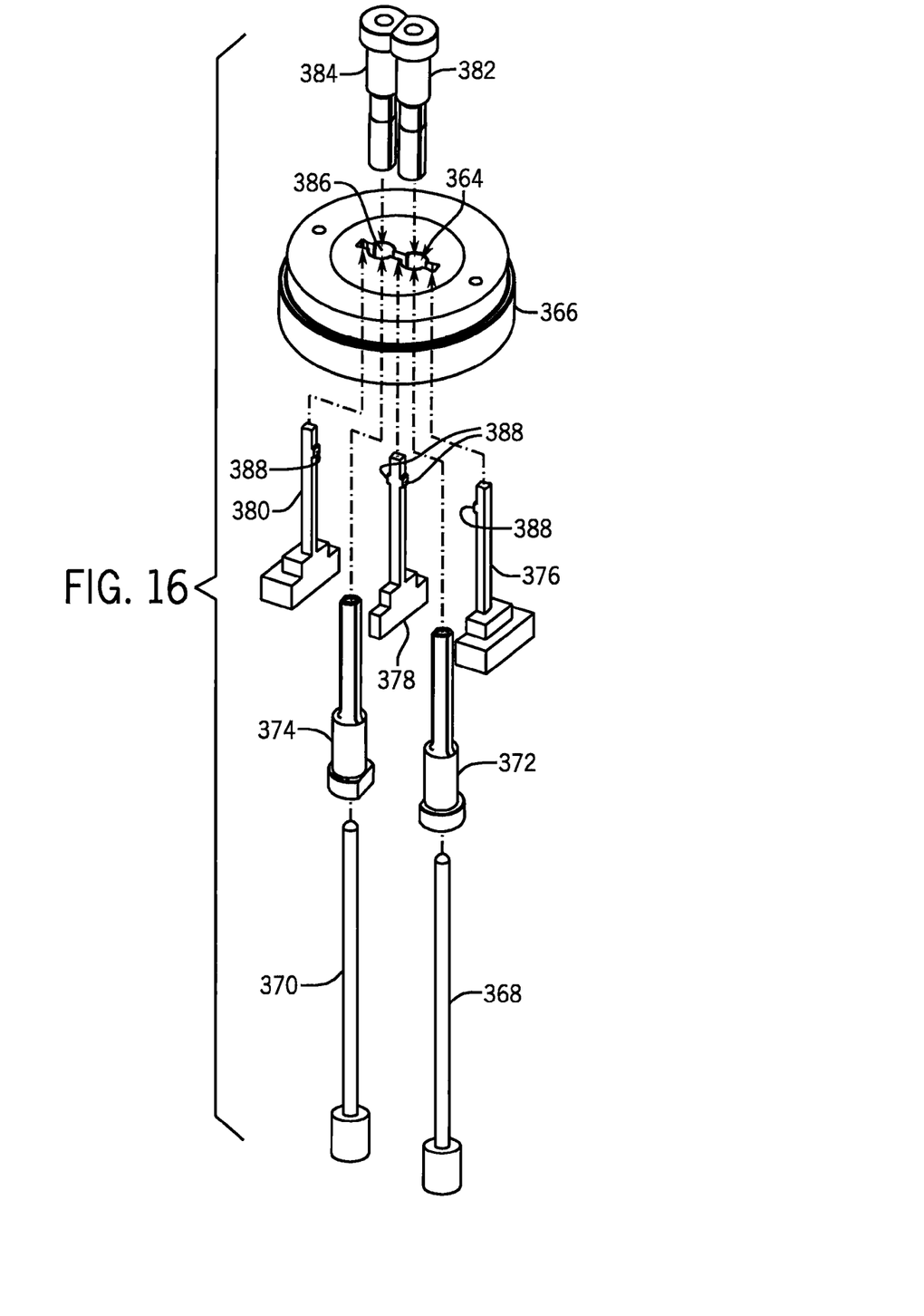
FIG. 16 is an exploded perspective view of a tooling assembly for manufacturing the compression limiter.
Figure 17:
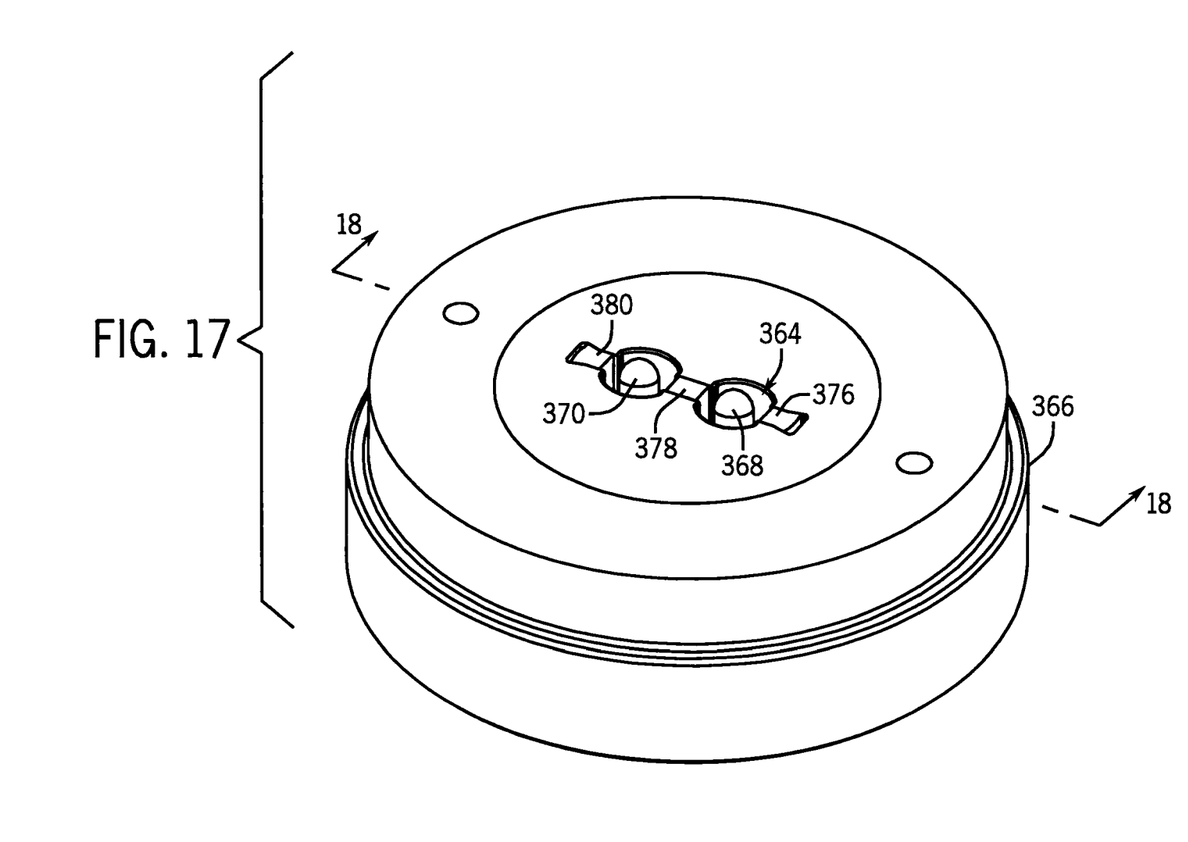
FIG. 17 is a perspective view of a first manufacturing step for the compression limiter.
Figure 18:
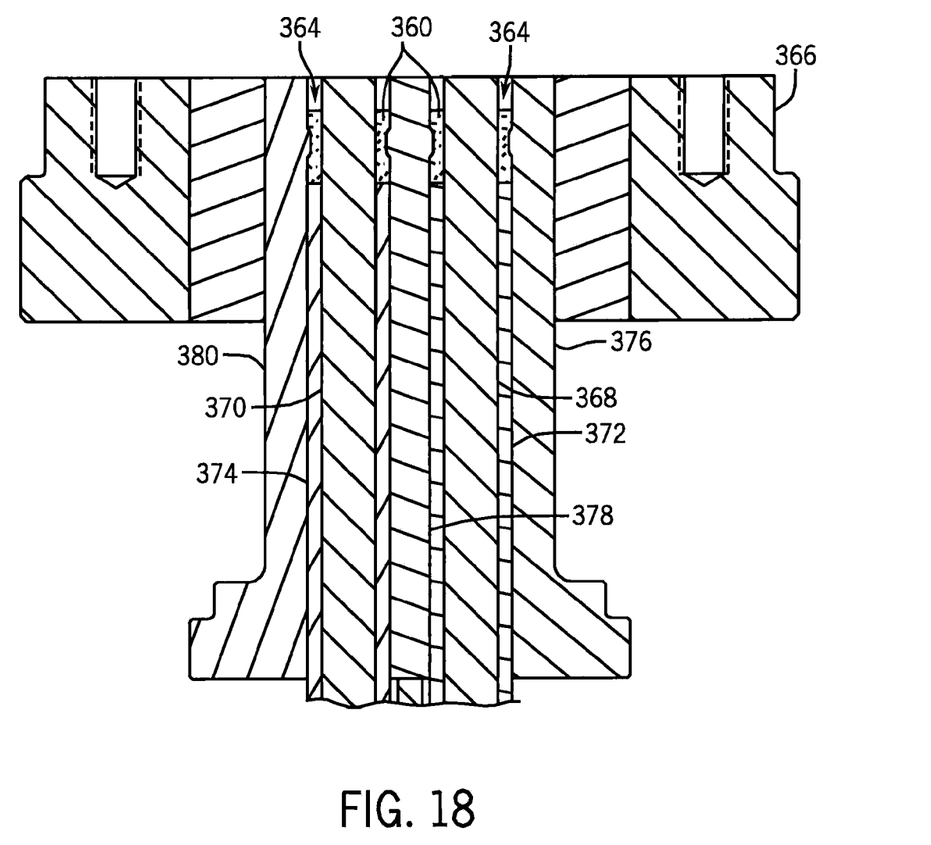
FIG. 18 is a sectional view along line 18-18 of FIG. 17.
Figure 19:
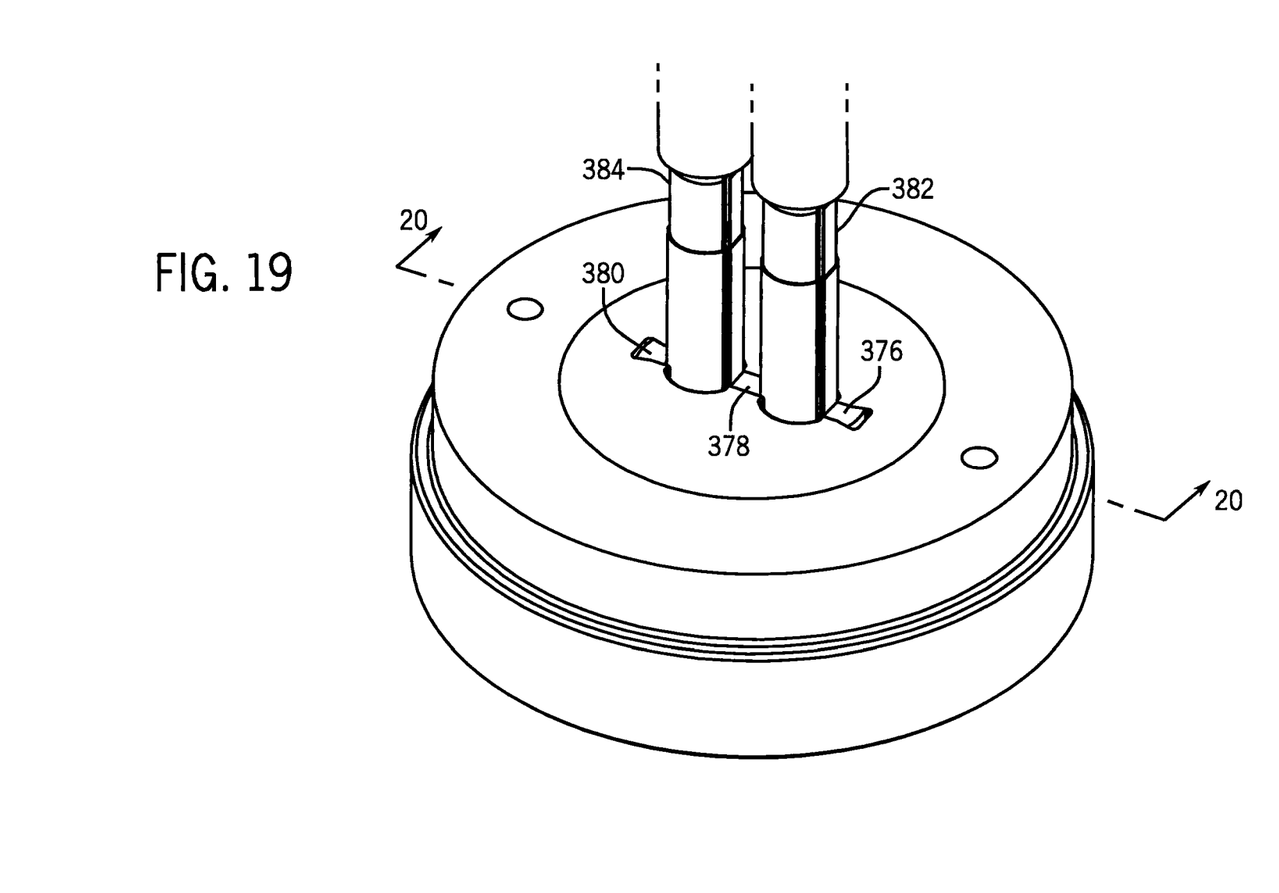
FIG. 19 is a perspective view of a second manufacturing step for the compression limiter.
Figure 20:
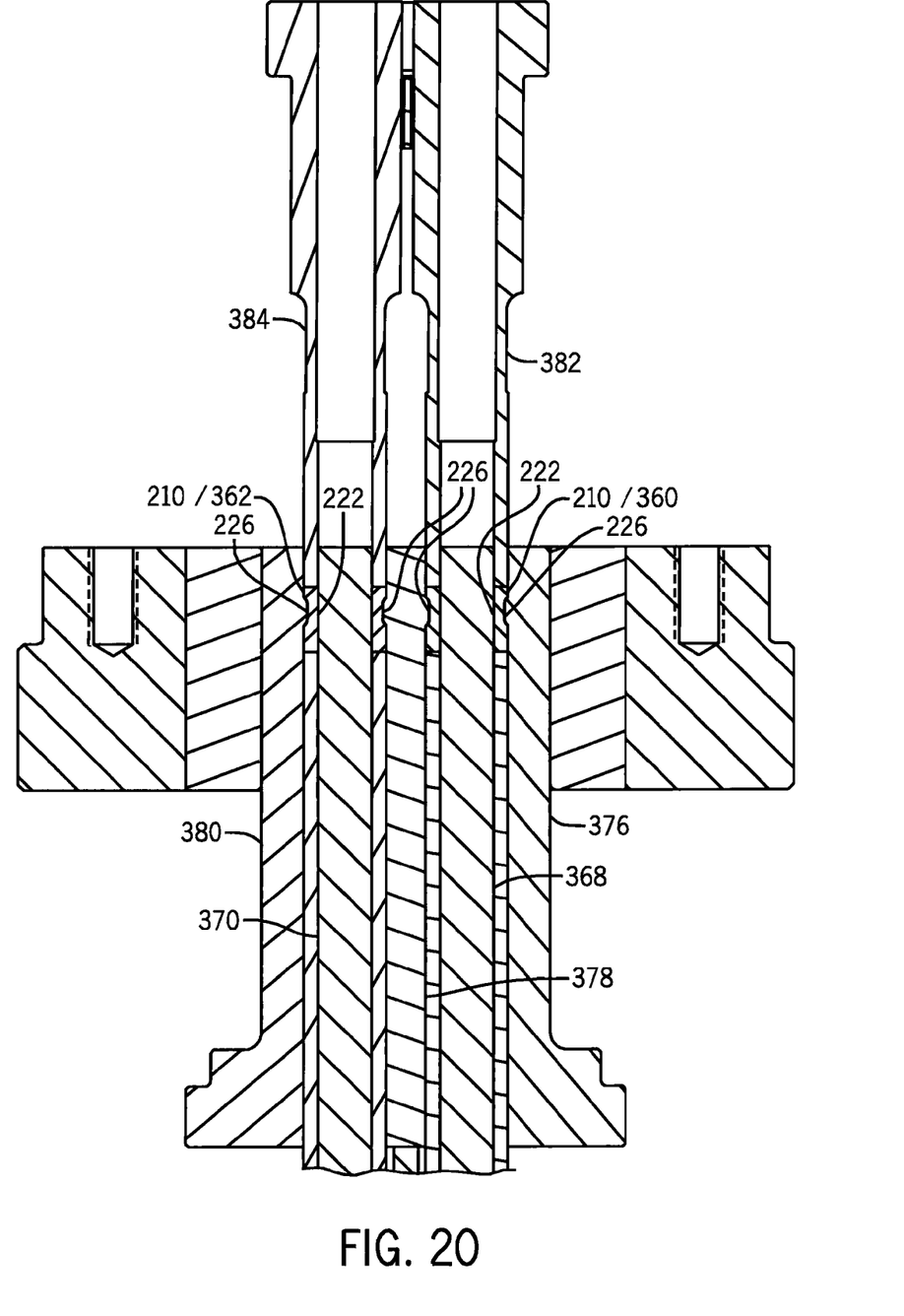
FIG. 20 is a sectional view along line 20-20 of FIG. 19.
Figure 21:
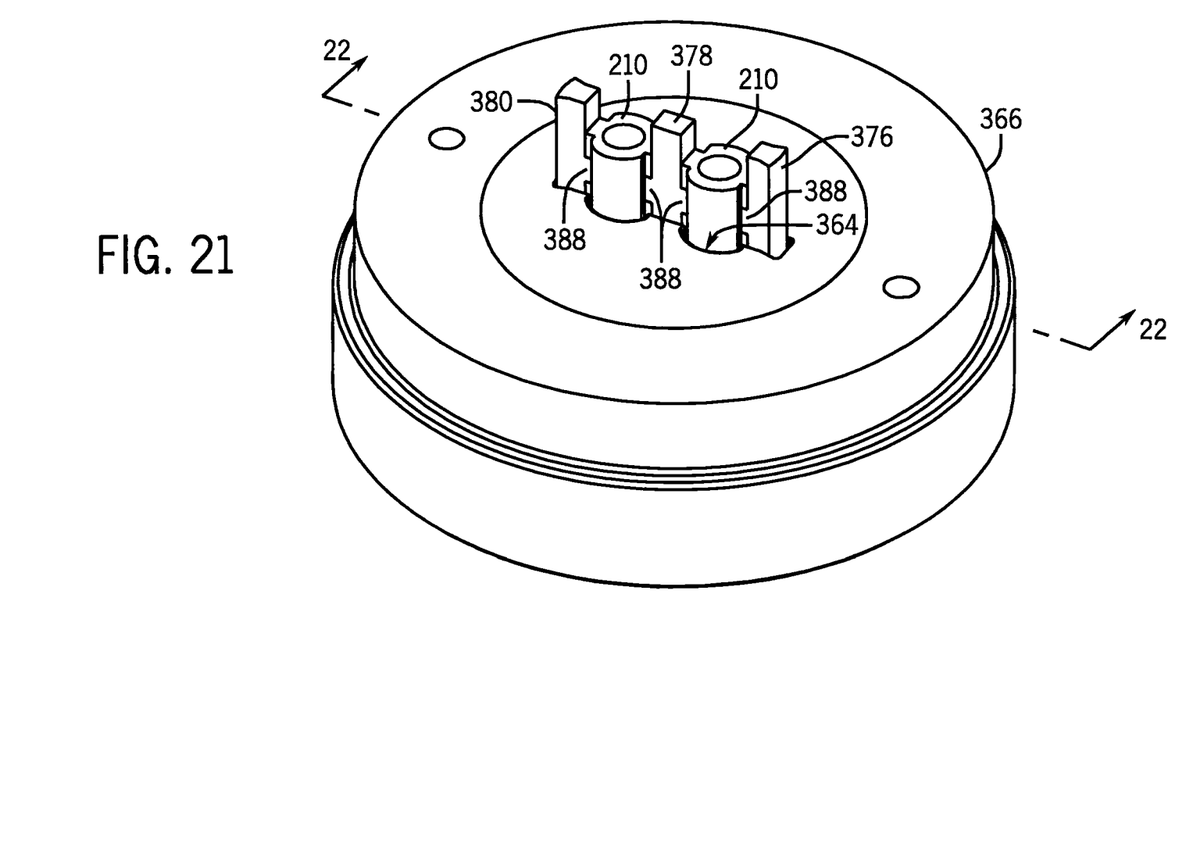
FIG. 21 is a perspective view of a third manufacturing step for the compression limiter.
Figure 22:
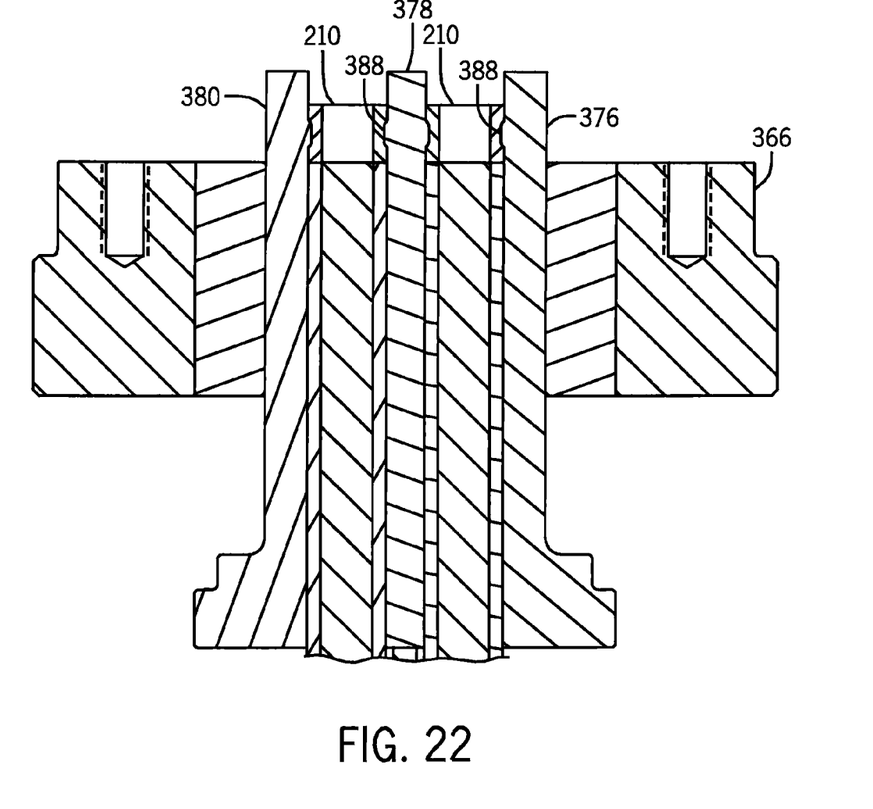
FIG. 22 is a sectional view along line 22-22 of FIG. 21.

Referring now to FIGS. 16-22, the compression limiter 210 is preferably manufactured as follows. The compression limiters 10, 110 are also preferably manufactured as follows, but only the compression limiter 210 and its features are referenced for simplicity. Referring to FIGS. 16-18, powder metal 360 (made from a carbon steel, stainless steel, aluminum alloy, bronze alloy, or the like) is filled into a die cavity 364 of a die 366. Several different components are disposed within the die cavity 364 and interact with the powder metal 360. For example, the powder metal 360 is positioned about core rods 368 and 370. The powder metal 360 is also supported by lower punches 372 and 374 (FIGS. 16 and 18). Some of the powder metal 360 is disposed between a right side punch 376 and a central punch 378. The rest of the powder metal 360 is disposed between the central punch 378 and a left side punch 380. Referring now to FIGS. 16, 19, and 20, the powder metal 360 is next pressed by the lower punches 372 and 374 and upper punches 382 and 384. This action causes an inner surface 386 of the die cavity 364 (FIG. 16) to shape the outer surfaces of the compression limiters 210. The core rods 368, 370 simultaneously shape the inner surfaces 222 of the compression limiters 210. Further still, the side punches 376, 380 and the central punch 378 simultaneously shape the retainers 226 of the compression limiters 210. Specifically, the right side punch 376 shapes a first retainer 226 on a first compression limiter 210, the central punch 378 shapes a second retainer 226 on the first compression limiter 210, the central punch 378 shapes a first retainer 226 on a second compression limiter 210, and the left side punch 380 shapes a second retainer 226 on the second compression limiter 210. As shown most clearly in FIG. 16, each of the side punches 376, 380 includes a protrusion 388 to shape an undercut surface 236 on one of the retainers 226, and the central punch 378 includes two protrusions 388 to shape an undercut surfaces 236 on each of the retainers 226. Referring now to FIGS. 16, 21, and 22, the compression limiters 210 are removed from the die cavity 364 by lowering the die 366 in the compression direction relative to the side punches 376, 380 and the central punch 378. The compression limiters 210 may be collected by sliding them laterally relative to the longitudinal direction 20 (i.e., in the direction permitted by the protrusions 388). Finally, a coating may be applied to the compression limiters 210, such as a zinc and clear chromate coating as provided by ASTM B633 type 3 class 1 or the like.

Those skilled in the art will appreciate changes to the apparatus described above that permit three or more compression limiters 210 to be manufactured during each cycle. Furthermore, those skilled in the art may appreciate that the compression limiter 210 may be formed by a simplified process wherein a single compression limiter 210 is manufactured during each cycle. However, it is preferred to manufacture two or more compression limiters 210 during each cycle so that the net transverse load applied to the die 366 is reduced. That is, a single upper punch may apply a transverse load (e.g., towards one of the side punches 376, 380) in addition to the load in the compression direction. The transverse load must be resisted by the die 366 and can cause wear on the punches and the die 366. However, the transverse loads applied by two or more upper punches 382, 384 operating simultaneously may cancel each other and thereby reduce the net transverse load applied to the die 366.

From the above disclosure, it should be apparent that the present invention provides a compression limiter with retention features that resist both translational and rotational motion. In addition, the compression limiter is easily shaped in a single tooling assembly.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. A method of forming a compression limiter from powder metal, comprising the steps of:
    pressing the powder metal in a longitudinal direction with a movable punch and thereby shaping an outer surface of the compression limiter against an inner die surface of a die cavity;
    shaping an inner surface of the compression limiter against a core rod disposed in the die cavity while simultaneously shaping the outer surface, a distance between the outer surface and the inner surface of the compression limiter defining a radial direction perpendicular to the longitudinal direction;
    shaping a retainer projecting from the outer surface of the compression limiter against a side punch disposed in the die cavity while simultaneously shaping the outer surface, the retainer including:
        a first retention surface having at least a planar portion perpendicular to the radial direction;
        an undercut surface being disposed radially inwardly from the first retention surface so as to create a corner extending in a direction with at least a component perpendicular to the longitudinal direction; and
    removing the compression limiter from the die cavity by lowering the die cavity relative to the side punch and moving the compression limiter laterally out of engagement with the side punch relative to the longitudinal direction.

2. The method of claim 1, wherein the die cavity is lowered in the longitudinal direction relative to the side punch.

3. The method of claim 1, wherein the retainer is a first retainer and the side punch is a first side punch, and further comprising the step of shaping a second retainer projecting from the outer surface against a second side punch while simultaneously shaping the outer surface.

4. The method of claim 3, further comprising the step of applying a coating including zinc to the compression limiter.

5. A method of simultaneously forming a plurality of compression limiters in a single die cavity, each compression limiter being formed from powder metal, comprising the steps of:
pressing the powder metal with a movable punch and thereby shaping an outer surface of each compression limiter against an inner die surface of the die cavity;
shaping an inner surface of each compression limiter against a core rod disposed in the die cavity while simultaneously shaping the outer surface;
shaping a retainer projecting from the outer surface of each compression limiter against a side punch disposed in the die cavity while simultaneously shaping the outer surface, each retainer including:
a first retention surface having at least a planar portion;
an undercut surface disposed toward the inner surface of the compression limiter relative to the first retention surface so as to create a corner extending in a direction with at least a component perpendicular to a longitudinal direction; and
removing each compression limiter from the die cavity by lowering the die cavity relative to the side punch and moving the compression limiter laterally out of engagement with the side punch relative to the longitudinal direction.

6. The method of claim 5, wherein each retainer further includes a second retention surface having at least a planar portion, the undercut surface of each retainer being disposed between the first and second retention surfaces.

7. The method of claim 5, further comprising the step of shaping a second retainer projecting from the outer surface of a first of the compression limiters, the second retainer being shaped against a central punch disposed in the die cavity while simultaneously shaping the outer surface of the first compression limiter.

8. The method of claim 7, further comprising the step of shaping a second retainer projecting from the outer surface of a second of the compression limiters, the second retainer of the second compression limiter being shaped against the central punch while simultaneously shaping the outer surface of the second compression limiter.

9. The method of claim 8, wherein the first and second retainers of the first compression limiter are diametrically opposed about the outer surface of the first compression limiter.

10. The method of claim 5, wherein the retainer of a first of the compression limiters is shaped by a right side punch, the retainer of a second of the compression limiters is shaped by a left side punch, and further comprising the step of shaping a second retainer projecting from the outer surface of each of the first and second compression limiters, each of the second retainers being shaped against a central punch disposed in the die cavity while simultaneously shaping the outer surfaces.

11. The method of claim 1, wherein the retainer is formed between the side punch and a second side punch and is extricated from engagement with the side punches after the die cavity is lowered relative to the side punch by being moved laterally relative to both side punches.

12. The method of claim 1, wherein each retainer further includes a second retention surface having at least a planar portion, the undercut surface of each retainer being disposed between the first and second retention surfaces.

* * * * *